(12) United States Patent
Tanaka (10) Patent No.: US 9,223,768 B2
(45) Date of Patent: Dec. 29, 2015

(54) DOCUMENT MANAGEMENT APPARATUS AND DOCUMENT MANAGEMENT METHOD

(75) Inventor: Yusuke Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1080 days.

(21) Appl. No.: 13/295,368

(22) Filed: Nov. 14, 2011

(65) Prior Publication Data

US 2012/0124020 A1 May 17, 2012

(30) Foreign Application Priority Data

Nov. 15, 2010 (JP) .................................. 2010-255297

(51) Int. Cl.
*G06F 7/00* (2006.01)
*G06F 17/22* (2006.01)
*G06F 17/30* (2006.01)

(52) U.S. Cl.
CPC ...... *G06F 17/2288* (2013.01); *G06F 17/30309* (2013.01)

(58) Field of Classification Search
None
See application file for complete search history.

(56) References Cited

U.S. PATENT DOCUMENTS

| 5,347,653 A * | 9/1994 | Flynn et al. .................... 707/695 |
| 6,078,934 A * | 6/2000 | Lahey et al. .................... 715/205 |
| 2005/0198030 A1 * | 9/2005 | McKenney ........................ 707/8 |
| 2008/0228795 A1 * | 9/2008 | Lomet ............................ 707/101 |
| 2009/0024674 A1 * | 1/2009 | Gallagher ....................... 707/203 |
| 2009/0037383 A1 * | 2/2009 | Kang ................................. 707/3 |
| 2010/0185595 A1 * | 7/2010 | Gopalakrishnan et al. ... 707/695 |
| 2011/0066966 A1 * | 3/2011 | Worrall et al. ................. 715/776 |

FOREIGN PATENT DOCUMENTS

| JP | 2001-005728 A | 1/2001 |
| JP | 2006-107374 A | 4/2006 |

* cited by examiner

*Primary Examiner* — Shew-Fen Lin
*Assistant Examiner* — Jieying Tang
(74) *Attorney, Agent, or Firm* — Canon USA Inc. IP Division

(57) ABSTRACT

The file size of a binder document in a document management server that manages a version of a binder document is reduced. When updating a binder document, it is determined whether an original document included in the binder document of a past version includes a same document as an original document included in the binder document of a new version. If it is determined that the original document includes the same document, reference information regarding the same document in the binder document of the past version is stored as information corresponding to the original document of the new version. On the other hand, if it is determined that the original document does not include the same document, an entity file of the original document is stored as information corresponding to the original document of the new version.

9 Claims, 12 Drawing Sheets

Binder1 [V1.0]

| ORIGINAL DOCUMENT NAME | BINDER DOCUMENT ID | Ver | ENTITY OF ORIGINAL DOCUMENT |
|---|---|---|---|
| abc.doc | 1 | 1.0 | c5a857ab5a89... |
| def.doc | 1 | 1.0 | a1dc0e6d0a74... |

Binder1 [V2.0]

| ORIGINAL DOCUMENT NAME | BINDER DOCUMENT ID | Ver | ENTITY OF ORIGINAL DOCUMENT |
|---|---|---|---|
| abc.doc | 1 | 1.0 | null |
| def.doc | 1 | 2.0 | b8d9f0135289... |

DOCUMENT MANAGEMENT APPARATUS AND DOCUMENT MANAGEMENT METHOD

BACKGROUND OF THE INVENTION

1. Field of the Invention

The present invention relates to a document management apparatus and a document management method capable of managing a binder document containing one or more original documents, a display file that integrates the original documents into one document, and a setting file that designates a display method, and a storage medium.

2. Description of the Related Art

As an art of a combined document for integrating a plurality of documents into one file, there is a binder document containing one or more original documents, a display file that integrates the documents into one document, and a setting file that designates a display method. As the binder document includes a plurality of original documents, there is a problem that the file size can easily increase.

As a conventional art for reducing the file size of the binder document, Japanese Patent Application Laid-Open No. 2006-107374 discusses a technology that deletes an unused original document from the binder document.

However, the conventional art does not consider the reduction in file size when registering the binder document in a document management system for performing version management. In the existing document management system, even if the original document is not changed at a time of updating the binder document, entity files of all original documents are stored in a binder document of a new version. If display order is rearranged among the original documents included in the binder document, contents of the original document are not changed and only the setting file is thus updated. However, all entity files of a plurality of the original documents included in the binder document before the updating are also stored in the new version in this case. Especially, a problem of the increase in file size arises if the data size of the original document is large.

SUMMARY OF THE INVENTION

According to an aspect of the present invention, a document management apparatus manages a version of a binder document formed by integrating a plurality of original documents. The document management apparatus includes a first determination unit configured to, when updating a binder document, determine whether there is a same original document as the original document included in a new version of the updated binder document, in the original documents included in a past version of the updated binder document, and a storage unit configured to, when the first determination unit determines that there is the same original document in the original documents included in the binder document of the past version, store reference information regarding the same document as information corresponding to the original document included in the binder document of the new version and, when the first determination unit determines that there is not the same original document in the original documents included in the binder document of the past version, and store an entity file of the original document as the information corresponding to the original document included in the binder document of the new version. The reference information has a file size smaller than that of the entity file.

According to the present invention, it is possible to reduce the file size of the binder document stored as the new version, when storing the new version of the binder document in the document management server that performs the version management of the file size.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
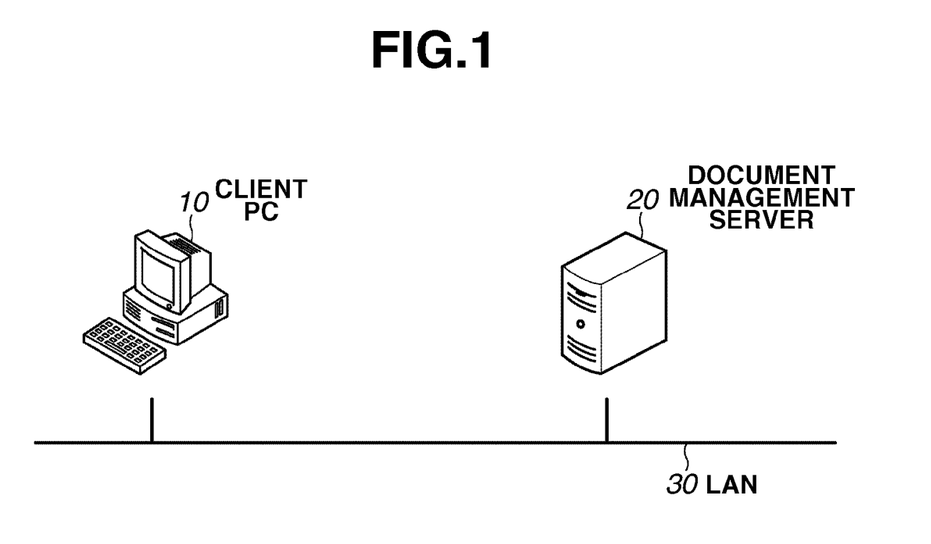
FIG. 1 illustrates a system configuration of a document management system according to an exemplary embodiment of the present invention.

FIG. 1 illustrates a system configuration of a document management system according to an exemplary embodiment of the present invention. The document management system includes a client personal computer (PC) 10 as an information processing apparatus and a document management server 20 as a document management apparatus. The client PC 10 is connected to the document management server 20 via a local area network (LAN) 30.

The client PC 10 is connected to the document management server 20 via a browser to provide a function for operating various contents such as a document or a folder managed by the document management server 20. The document management server 20 provides a document management function for managing various contents such as a document or a folder and a web application server function.

According to the present exemplary embodiment, a user operates the client PC 10 to issue an instruction to various contents managed by the document management server 20. Alternatively, directly via the document management server 20, the contents may be operated and an instruction may be issued. The document management system according to the present exemplary embodiment is accessed via the browser in the client PC 10. Alternatively, dedicated client application (not illustrated) may be installed to the client PC 10, which is operated with the client application.

Figure 2:
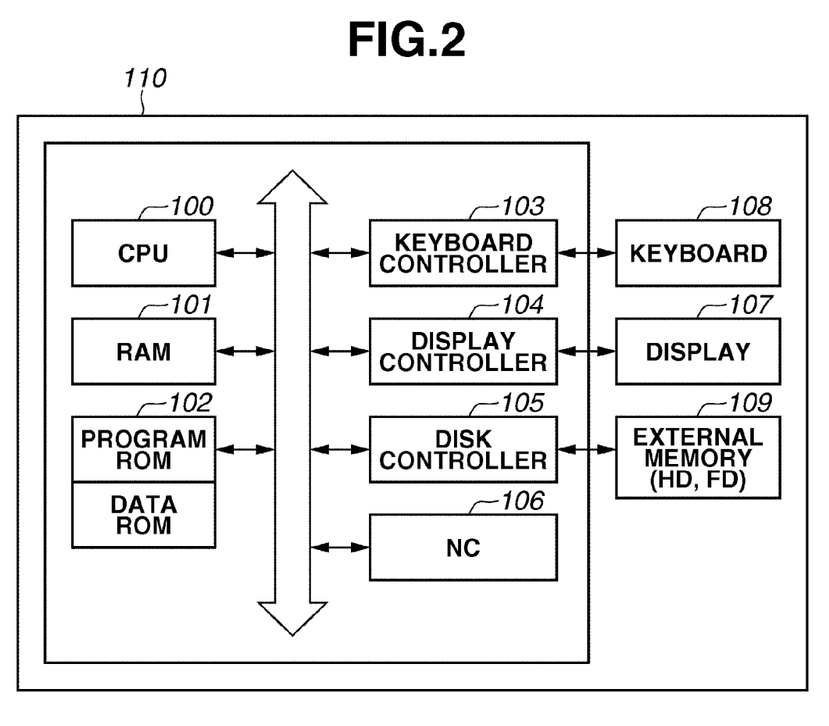
FIG. 2 illustrates a hardware configuration of the document management system according to the exemplary embodiment of the present invention.

FIG. 2 illustrates a hardware configuration of components forming the document management system according to the exemplary embodiment of the present invention. Both the client PC 10 and the document management server 20 have hardware configurations of a general information processing apparatus. The hardware configuration of the general information processing apparatus in FIG. 2 can be applied to the client PC 10 and the document management server 20.

Referring to FIG. 2, a central processing unit (CPU) 100 executes an operating system (OS) or a program such as application, stored in a program ROM in a read only memory (ROM) 102, or loaded to a random access memory (RAM) 101 from a hard disk (HD) 109. The CPU 100 executes the program to realize processing in flowcharts described below. The RAM 101 functions as a main memory or a work memory of the CPU 100. A keyboard controller 103 controls an input from a keyboard 108, or a pointing device (not illustrated) such as a mouse. A display controller 104 controls display operations of the display 107. A disk controller 105 controls data access to the hard disk (HD) 109 or a floppy (registered trademark) disk (FD) for storing various data. A network card (NC) 106 controls communication with another device via a network.

Figure 3:
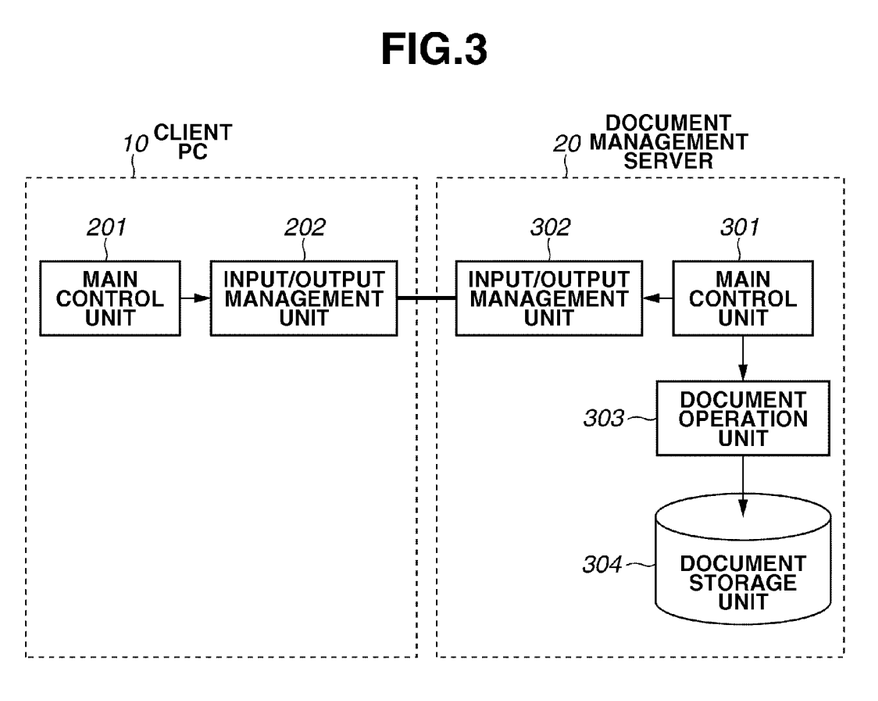
FIG. 3 illustrates a software configuration of the document management system according to the exemplary embodiment of the present invention.

FIG. 3 illustrates a software configuration of the document management system according to the exemplary embodiment of the present invention. According to the present exemplary embodiment, all functions of the document management system are realized by the programs which the CPUs 100 in the client PC 10 and the document management server 20 execute.

The software configuration of the client PC 10 includes a main control unit 201 and an input/output management unit 202. The main control unit 201 controls the entire client PC 10, issues an instruction to each unit, and manages each unit.

The input/output management unit 202 detects a user operation of the keyboard 108 in the client PC 10, and executes processing corresponding to the operation. The input/output management unit 202 displays a user interface (UI) on the display 107 in the client PC 10, and receives and transmits information via the LAN 30.

The software configuration of the document management server 20 includes an input/output management unit 302, a main control unit 301, a document operation unit 303, and a document storage unit 304. The main control unit 301 controls the entire document management server 20, issues an instruction to each unit, and or manages each unit.

The input/output management unit 302 detects a user operation of the keyboard 108 in the document management server 20, and executes processing corresponding to the operation. The input/output management unit 302 displays the UI on the display 107 in the document management server 20, and receives and transmits information via the LAN 30.

The document operation unit 303 instructs processing such as registration, acquisition, or deletion to a document stored in the document storage unit 304 in response to an instruction of the main control unit 301. The document storage unit 304 stores various contents such as a document or a file managed by the document management server 20 and information regarding the contents.

A description is given of the details of processing in the document management system according to the exemplary embodiment of the present invention with reference to FIGS. 4 to 12.

Figure 4:
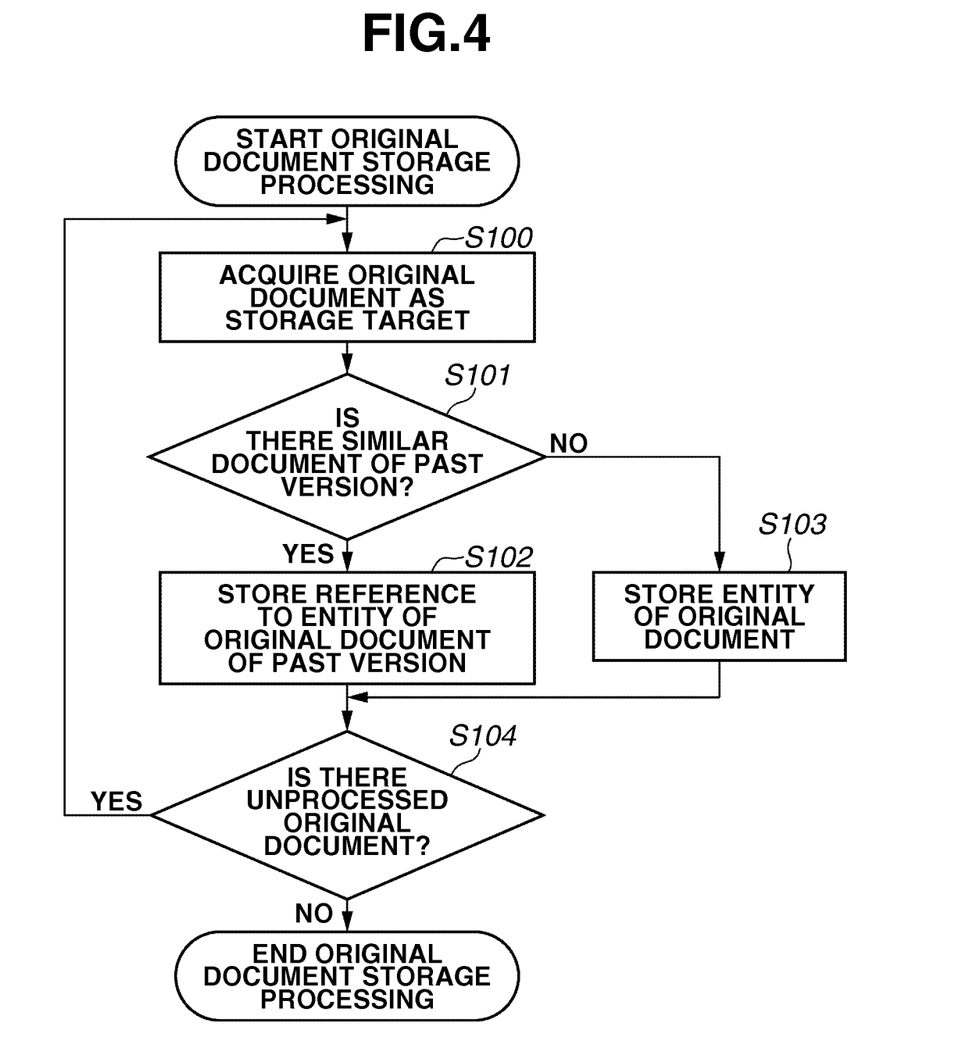
FIG. 4 illustrates a flowchart of storage processing of an original document when updating a binder document in the document management system according to the exemplary embodiment of the present invention.

FIG. 4 illustrates a flowchart for registering an original document when updating a binder document in the document management system according to the exemplary embodiment of the present invention. The processing is performed when the binder document stored in the document storage unit 304 is updated with the binder document which is updated on the client PC 10 side, as the binder document of a new version.

In step S100, the main control unit 301 acquires the original document to be stored, among the original documents included in the binder document of the new version via the input/output management unit 302, from the client PC 10. In step S101, the main control unit 301 determines, via the document operation unit 303, whether there is a same document as the original document to be stored, in the original documents included in the binder document to be updated of a past version. If the main control unit 301 determines that there is the same document (YES in step S101), the processing proceeds to step S102. If the main control unit 301 determines that there is not the same document (NO in step S101), the processing proceeds to step S103.

In step S102, the main control unit 301 stores, via the document operation unit 303, reference information regarding an entity file of the same document that was determined as existing in the prior step S101, as the information corresponding to the original document to be stored in the binder document of the new version to be registered. The reference information has the file size smaller than that of the entity file of the original document, and is stored in place of the entity file of the original document to be stored in the binder document of the new version as the storage target, which enables reduction of the file size.

In step S103, the main control unit 301 stores the entity file of the original document included in the binder document of the new version, as information corresponding to the original document to be stored in the binder document of the new version to be registered, via the document operation unit 303.

In step S104, the main control unit 301 checks whether there is an unprocessed original document included in the binder document of the new version via the document operation unit 303. If the main control unit 301 determines that there is the unprocessed original document (YES in step S104), the processing shifts to step S100. If the main control unit 301 determines that there is no unprocessed original document (NO in step S104), the processing ends.

According to the present exemplary embodiment, the description is given of one new version of binder document. Alternatively, a binder document A may be included as the past version of a binder document B when the binder document A of an arbitrary version branches to the binder document B.

Figure 5:
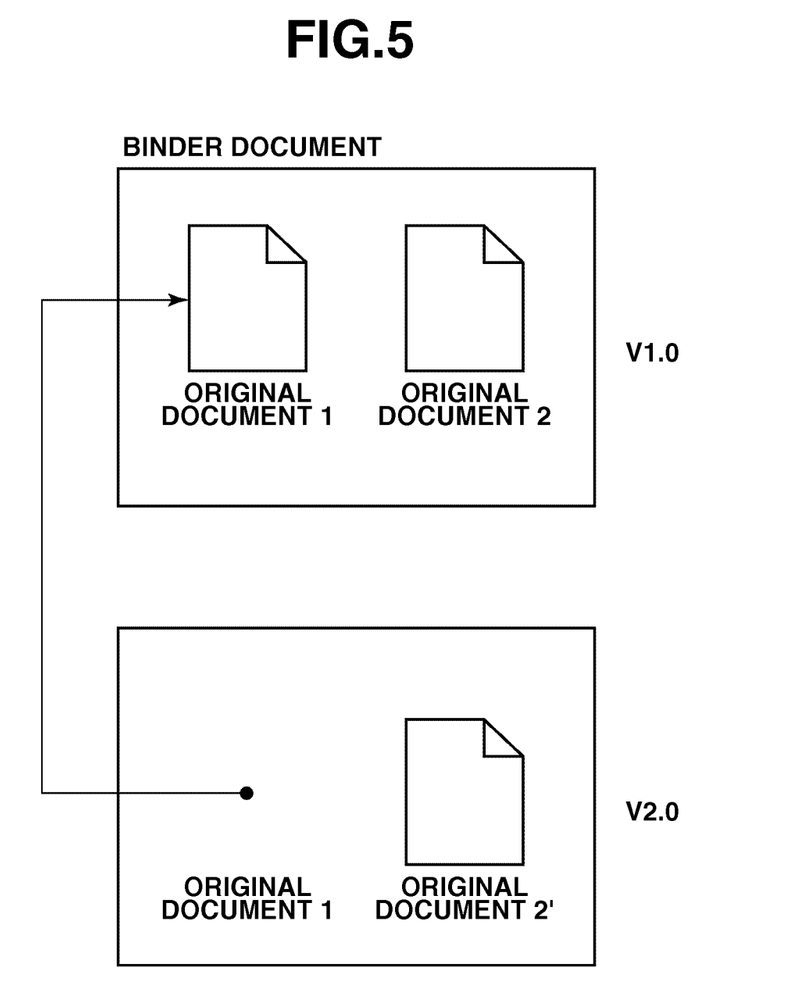
FIG. 5 illustrates a state of the original document when updating the binder document in the document management system according to the exemplary embodiment of the present invention.

FIG. 5 illustrates an example of a data structure after updating the binder document registered in the document management server 20, in the document management system according to the exemplary embodiment of the present invention. A description about a component of the binder document is omitted except for the original document.

The binder document V1.0 of the past version before updating includes original documents 1 and 2. FIG. 5 illustrates a data structure when the binder document is updated with the binder document V2.0 of the new version in which the original document 2 has been edited.

At this time, the original document 1 is not edited and the same document exists in the original document included in the past version. Therefore, as illustrated by an arrow, reference information regarding the original document 1 included in the binder document V1.0 of the past version is stored as information corresponding to the original document 1 in the binder document V2.0.

On the other hand, the original document 2 in the binder document V1.0 is edited using the client PC 10 and changed to an original document 2' included in the binder document V2.0. Therefore, the same document does not exist in the past version of the original document 2. Thus, an entity file of the original document 2' is stored as information corresponding to the original document 2' in the binder document V2.0.

FIG. 6 illustrates an example of a data structure of the original document included in the binder document, in the document management system. An explanation of another component included in the binder document will be omitted except for the original document.

Each table (FIGS. 6A, 6B) is provided for each version of the binder document. The tables enable management of the reference information and the entity file of the original document included in each version.

Figure 6A:
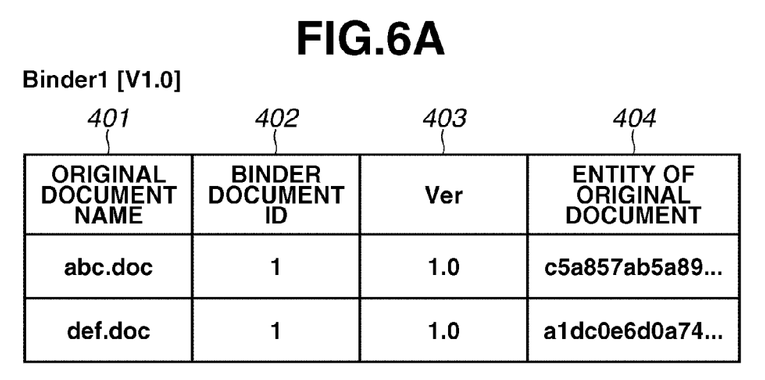
FIG. 6 illustrates a data structure of an original document in a binder document in the document management system according to the exemplary embodiment of the present invention.
Figure 6B:
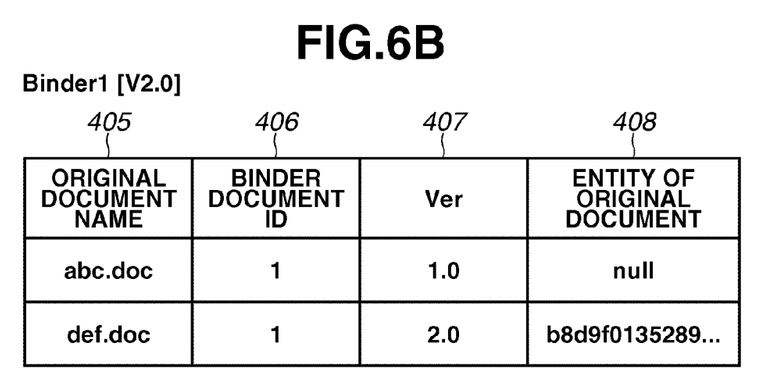

Items in the tables will be described. Original document names 401 and 405 are used for specifying the original document. Binder document IDs 402 and 406 are used for specifying ID of the binder document having the entity file of the original document.

Vers 403 and 407 specify IDs of the version having the entity file of the target original document among the versions of the binder document specified by the binder document ID. Entities 404 and 408 of the original document are entity files of the original document, and are stored only when there is an entity of the original document in a target version. Since an original document name "abc.doc" has a same file in the binder documents V1.0 and V2.0, there is no entity file in the binder document V2.0. To specify an entity of the original document name "abc.doc" in the binder document V2.0, a binder document and a version which have the entity are specified based on the binder document ID 406 and the version number Ver 407 in a row of abc.doc in the binder document V2.0. Then, a file is acquired from the entity 404 of the original document in the row of "abc.doc" of the specified version.

Figure 7:
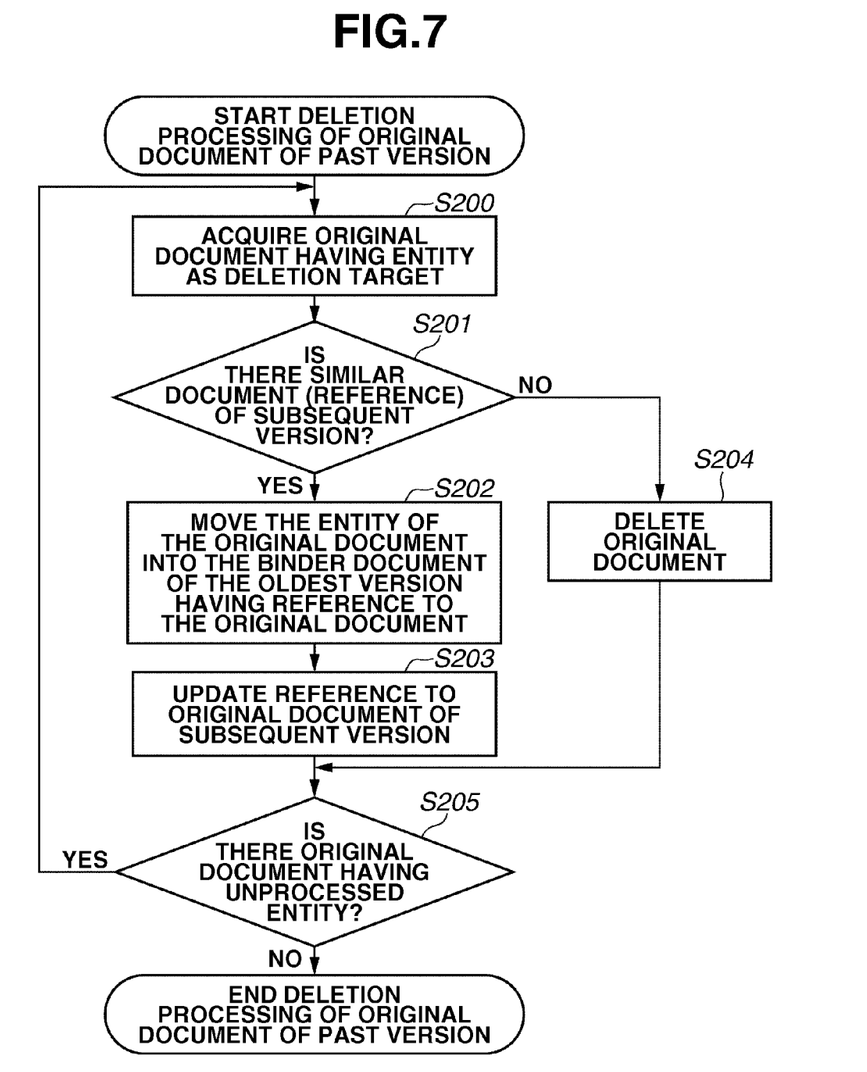
FIG. 7 illustrates a flowchart of deletion processing of an original document of a past version when deleting the past version in the document management system according to the exemplary embodiment of the present invention.

FIG. 7 illustrates a flowchart of deletion processing of the original document included in the binder document of the past version when deleting the binder document of the past version in the document management system. The present processing starts when a deletion instruction of the binder document of an arbitrary past version is received from the client PC 10 by the document management server 20.

In step S200, the main control unit 301 acquires the original document having an entity from the original documents included in the binder document of a deletion target version designated by the deletion instruction, via the document operation unit 303.

In step S201, the main control unit 301 determines, via the document operation unit 303, whether there is reference information regarding the entity file of the original document to be deleted, in the binder documents of versions (newer than the deletion target version) coming after the deletion target version. If the main control unit 301 determines that there is the reference information (YES in step S201), the processing proceeds to step S202. If the main control unit 301 determines that there is no reference information (NO in step S201), the processing proceeds to step S204.

In step S202, the main control unit 301 moves the entity file of the original document into the binder document of the oldest version among the binder documents of the versions having the reference information. I.e. the main control unit 301 determines, as a binder document of movement target version, the binder document of the oldest version among the binder documents of the versions having the reference information, and stores the entity file into the binder document determined as the movement target version. At this time, the reference information is deleted in the binder document into which the entity file has been moved. In step S203, the main control unit 301 updates the reference information regarding the original document included in the binder document of the versions (newer than the movement target version) coming after the movement target version such that the entity file moved into the movement target version is referred to.

In step S204, the main control unit 301 deletes the entity file of the original document included in the binder document of the deletion target version, via the document operation unit 303. In step S205, the main control unit 301 checks, via the document operation unit 303, whether there is an unprocessed original document having an entity in the binder document of the deletion target version. If the main control unit 301 determines that there is the unprocessed original document having the entity (YES in step S205), the processing proceeds to step S200. If the main control unit 301 determines that there is no unprocessed original document having the entity (NO in step S205), the processing ends.

In the above processing, the past version can be deleted while the entire file size of the binder document subjected to the version management can be reduced.

Figure 8:
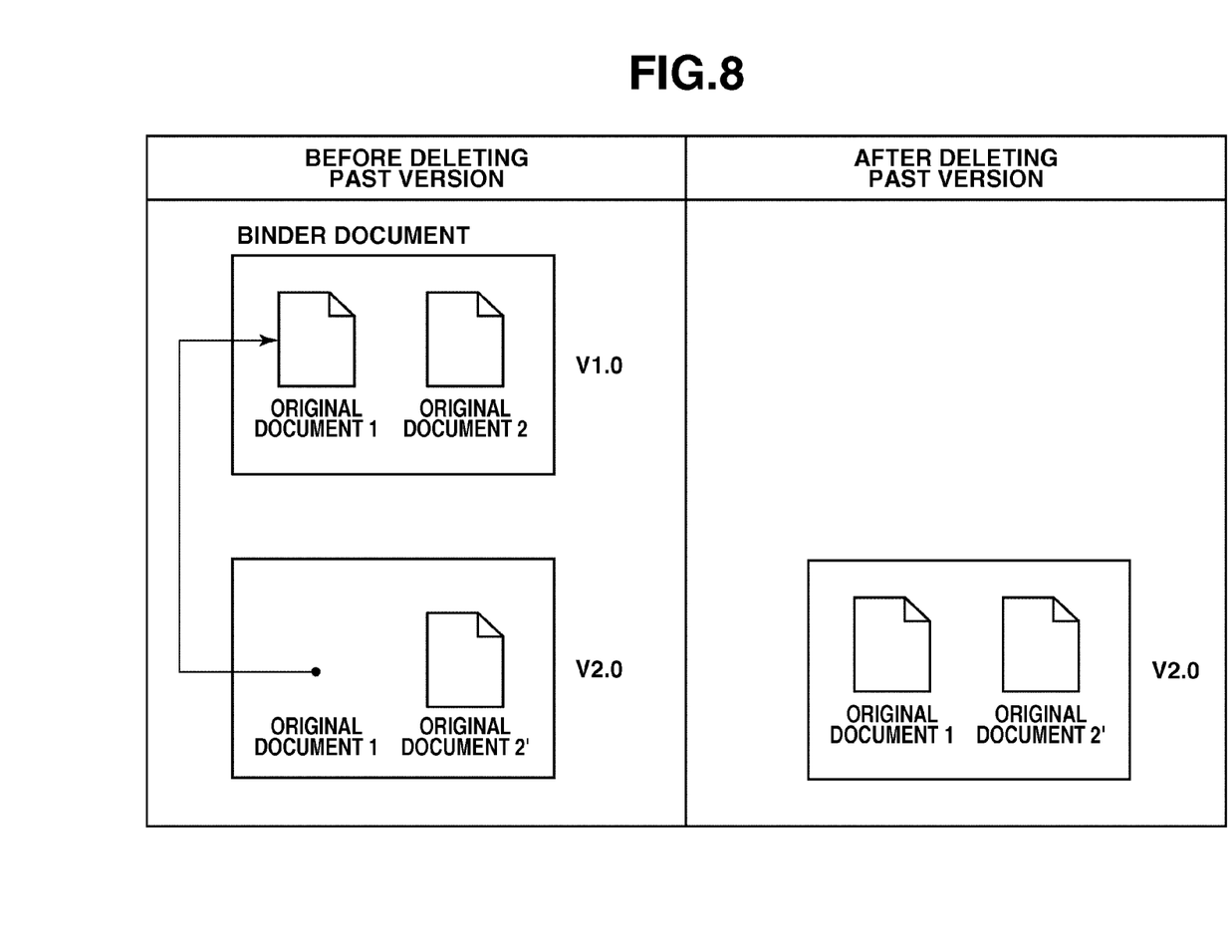
FIG. 8 illustrates a state of the original document when deleting the past version in the document management system according to the exemplary embodiment of the present invention.

FIG. 8 illustrates an example of a data structure preceding/subsequent to deleting of the binder document of the past version registered in the document management server 20 in the document management system. An explanation of another component included in the binder document will be omitted except for the original document.

In the data structure before deleting the binder document of the past version, there is no difference of the original document 1 between the binder documents V1.0 and V2.0. Thus, the entity file of the original document 1 is not stored in the binder document V2.0 but the reference information regarding the entity of the original document 1 included in the binder document V1.0 is stored. If the binder document V1.0 is deleted, the entity file of the original document 1 is moved into the binder document V2.0. Therefore, the data structure as illustrated in FIG. 8 appears after deleting the binder document of the past version V1.0 in FIG. 8.

Figure 9:
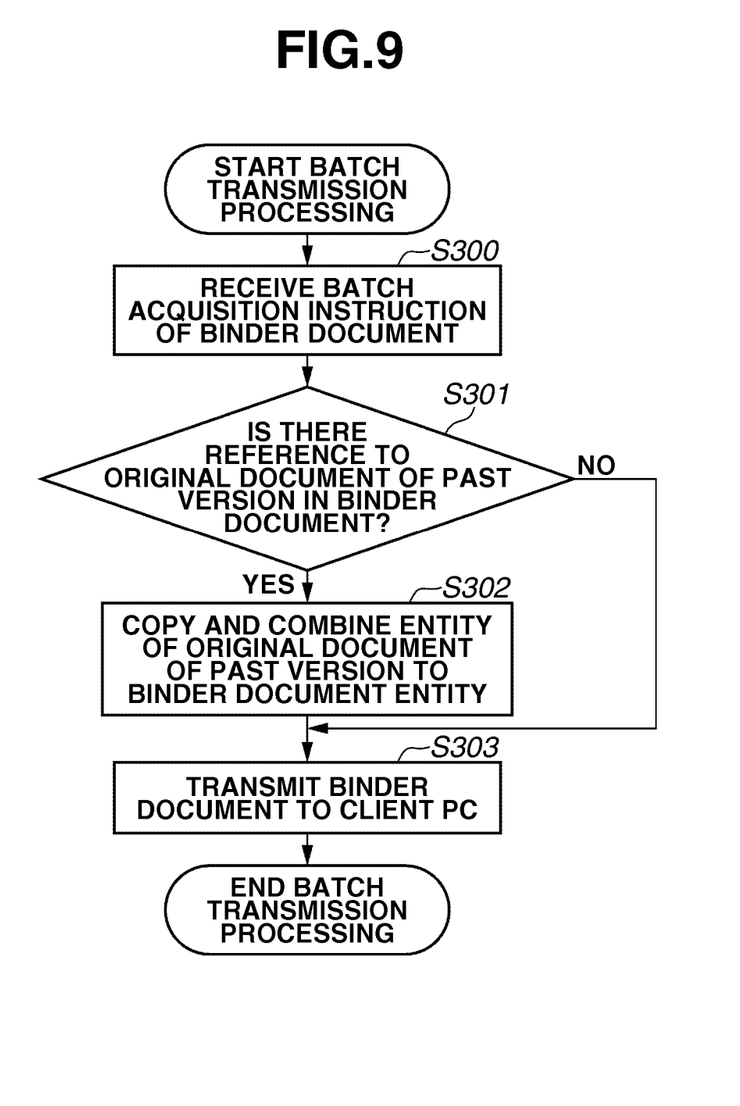
FIG. 9 illustrates a flowchart of batch transmission processing of the document management system according to the exemplary embodiment of the present invention.

FIG. 9 illustrates a flow of batch transmission processing for the binder document registered in the document management server 20 in the document management system.

In step S300, the main control unit 301 receives an instruction for batch acquisition of the binder document from the client PC 10 via the input/output management unit 302. The batch acquisition instruction is issued from the client PC 10 to transmit the designated binder document of an arbitrary version from the document management server 20 to the client PC 10. In the batch acquisition instruction, the version information and the binder document as an acquisition target are designated. The default version of the acquisition target designated by the batch acquisition instruction may be at all times set to the latest version of the binder document.

In step S301, the main control unit 301 determines, via the document operation unit 303, whether the binder document of the designated version includes the reference information regarding the entity file included in the binder document of the past version, as information corresponding to the original document included in the version of the binder document whose acquisition is designated. I.e. the main control unit 301 determines whether the binder document of the designated version includes the reference information regarding the entity file included in the binder document of the past version. If the main control unit 301 determines that there is the reference information (YES in step S301), the processing proceeds to step S302. If the main control unit 301 determines that there is no reference information (NO in step S301), the processing proceeds to step S303.

In step S302, the main control unit 301 copies the entity file referred by the reference information from the binder document of the past version into the binder document of the version designated by the batch acquisition instruction, via the document operation unit 303. Thus, the entity file is integrated from the binder document of the past version to generate a binder document of a transmission version. In step S303, the main control unit 301 transmits the binder document of the designated version (i.e. the transmission version) to the client PC 10 via the input/output management unit 302. The binder document transmitted to the client PC 10 includes all entity files corresponding to the original document included in the binder document. If the transmission version is generated in step S302, in step S303, the transmission version is transmitted.

According to the processing, it is possible to reduce the entire file size of the binder document subjected to the version management and respond to the batch acquisition instruction of the binder document.

Figure 10:
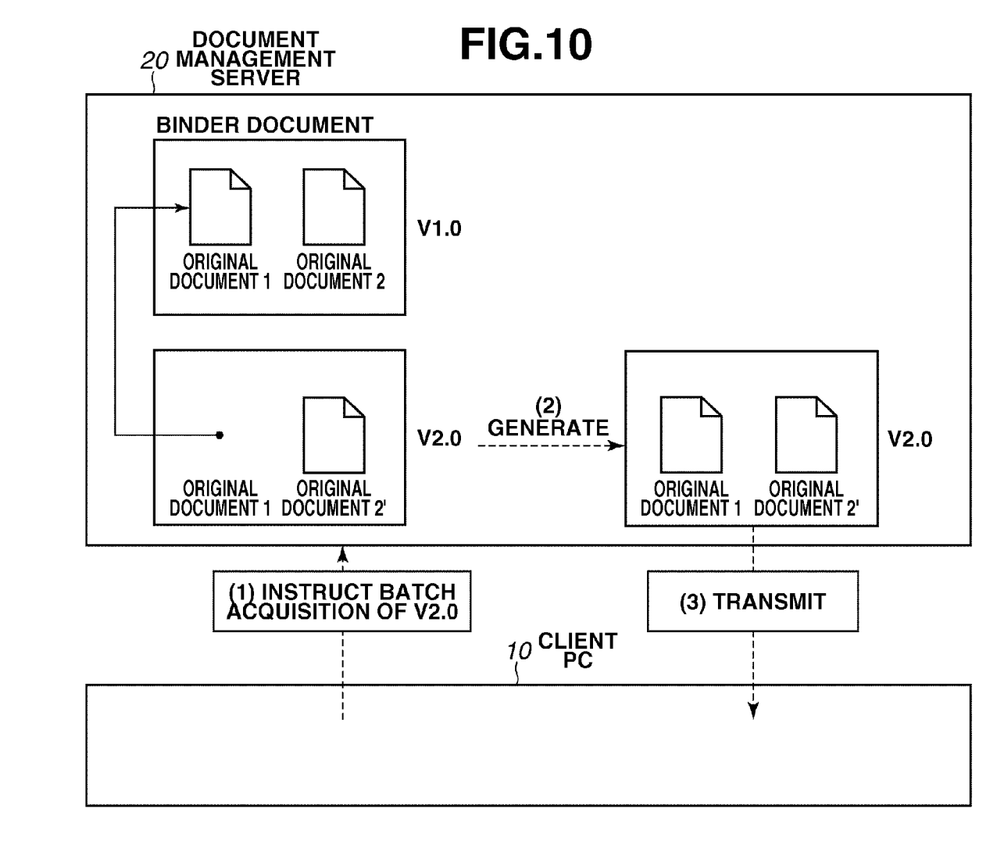
FIG. 10 illustrates reception and transmission of information in batch transmission in the document management system according to the exemplary embodiment of the present invention.

FIG. 10 illustrates an example of information exchange in the batch transmission of the binder document registered in the document management server 20 to the client PC 10, in the document management system. An explanation of another component included in the binder document will not be described except for the original document.

In the binder document registered in the document management server 20, there is no difference of the original document 1 between the binder documents V1.0 and V2.0. Therefore, the binder document V2.0 includes reference information regarding the entity file of the original document 1 included in the binder document V1.0. When the document management server 20 receives the batch acquisition operation of the binder document V2.0 from the client PC 10, the document management server 20 generates a binder document of a transmission version by integrating the entity file of the original document 1 included in the binder document V1.0, into the binder document V2.0. The generated binder document is transmitted to the client PC 10.

Figure 11:
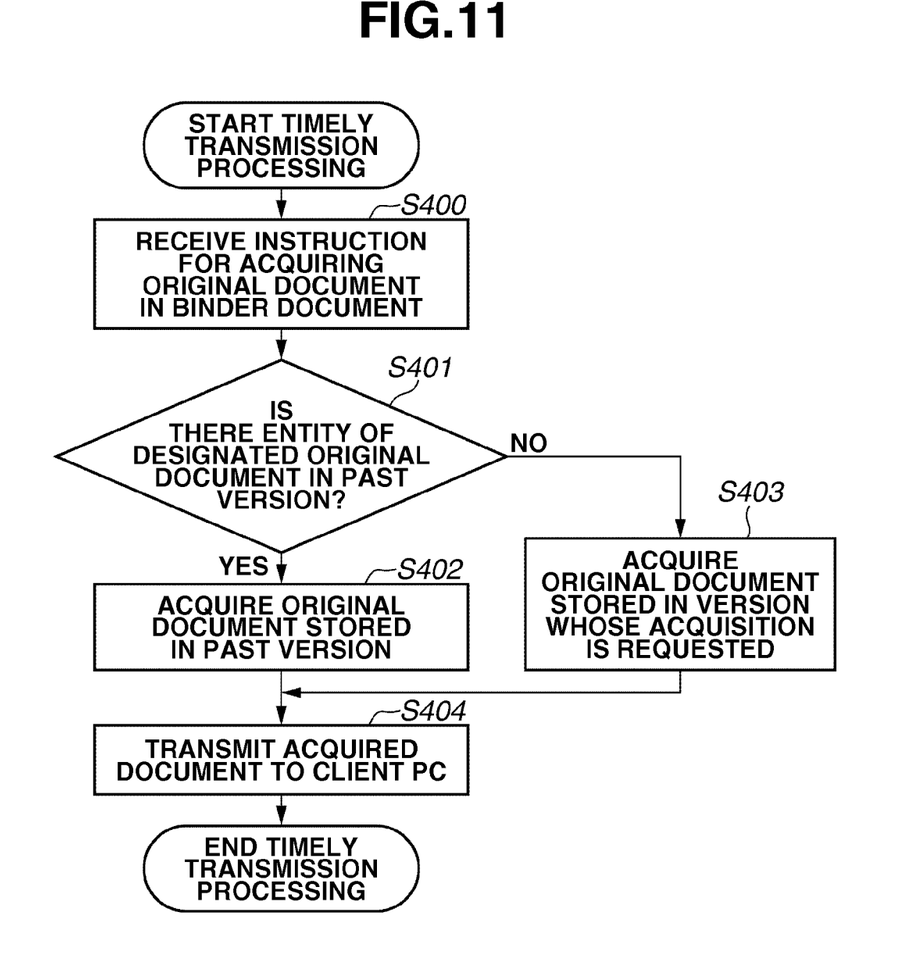
FIG. 11 illustrates a flowchart of timely transmission processing in the document management system according to the exemplary embodiment of the present invention.

FIG. 11 illustrates a flow of timely transmission processing of the binder document on the document management server 20 in the document management system. In order to perform the present flow, the client PC 10 acquires only a display file and a setting file minimum-required for displaying the binder document at the time of displaying the binder document registered in the document management server 20. Then, the present flow (FIG. 11) is executed when the original document is thereafter acquired to edit an arbitrary original document included in the binder document.

In step S400, the main control unit 301 receives an instruction to acquire the original document included in the binder document from the client PC 10 via the input/output management unit 302. The acquisition instruction of the original document is issued from the client PC 10 to transmit the designated original document from the document management server 20 to the client PC 10. Information regarding the acquisition target version and the original document is designated in the acquisition instruction of the original document. The acquisition target version designated in the acquisition instruction of the original document may be at all times set to the latest version of the binder document.

In step S401, the main control unit 301 determines whether the information corresponding to the original document included in the binder document of the designated acquisition target version is reference information regarding the entity file included in the binder document of the past version, via the document operation unit 303. If the main control unit 301 determines that the information is the reference information (YES in step S401), the processing proceeds to step S402. If the main control unit 301 determines that the information is not reference information but the entity file (NO in step S401), the processing proceeds to step S403.

In step S402, the main control unit 301 acquires the entity file of the original document included in the binder document of the past version via the document operation unit 303. In step S403, the main control unit 301 acquires, via the document operation unit 303, the entity file of the original document included in the binder document of the version whose acquisition is requested.

In step S404, the main control unit 301 transmits the acquired entity file of the original document to the client PC 10 via the input/output management unit 302.

Figure 12:
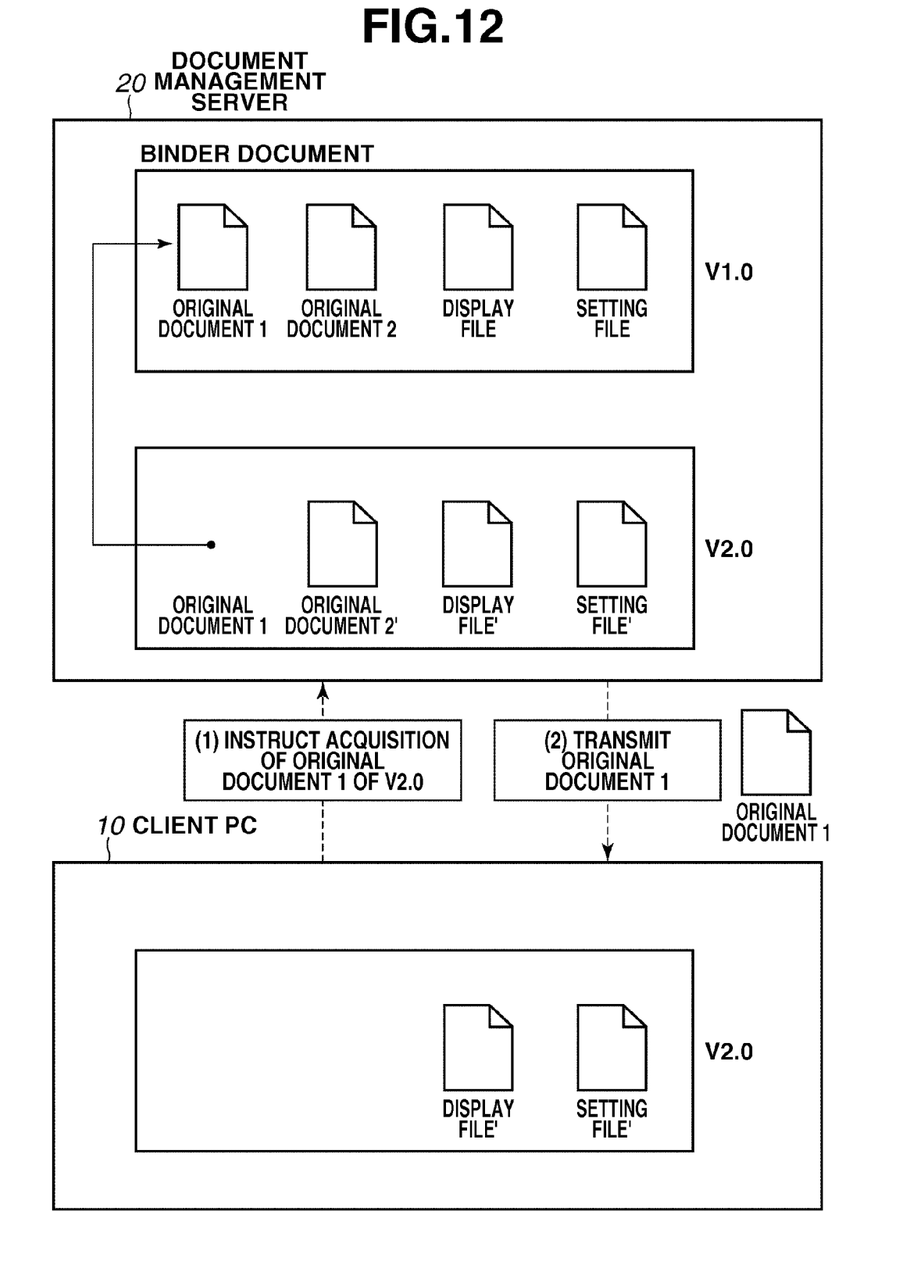
FIG. 12 illustrates reception and transmission of information in the timely transmission in the document management system according to the exemplary embodiment of the present invention.

FIG. 12 illustrates an example of information exchange when the binder document registered in the document management server 20 is timely transmitted to the client PC 10 in the document management system. In the binder documents registered in the document management server 20, there is no difference of the original document 1 between the binder documents V1.0 and V2.0. Therefore, the binder document V2.0 has reference information regarding the entity file of the original document 1 included in the binder document V1.0.

The client PC 10 acquires the display file and the setting file of the binder document V2.0 from the document management server 20 when the client PC 10 display the binder document V2.0. When the document management server 20 receives an instruction to acquire the original document 1 from the client PC 10, the document management server 20 determines whether the information corresponding to the original document 1 included in the binder document V2.0 is reference information regarding the entity file included in the binder document of the past version. The document management server 20 determines that the information is the reference information, and transmits the entity file of the original document 1 included in the binder document V1.0 to the client PC 10.

According to the present exemplary embodiment, every version does not have the entity file of the same original document. Therefore, it is possible to reduce the file size of the binder document registered in the document management server 20. The deletion process of the binder document of the past version, the batch transmission processing and the timely transmission processing can be executed. In particular, in the batch transmission processing, it is possible to provide the entire binder document by transmitting in a lump the original documents distributed in each version. On the other hand, in the transmission processing which is performed timely, it is possible to reduce the amount of transmission data of the binder document by transmitting minimum-required information.

OTHER EMBODIMENTS

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-255297 filed Nov. 15, 2010, which is hereby incorporated by reference herein in its entirety.

What is claimed is:

1. A document management apparatus that manages a version of a binder document formed by integrating a plurality of original documents, the document management apparatus comprising a memory and a processor which functions as:
   a first determination unit configured to, when updating a binder document, determine whether there is a same original document as the original document included in a new version of the updated binder document, in the original documents included in a past version of the updated binder document;
   a storage unit configured to, when the first determination unit determines that there is the same original document in the original documents included in the binder document of the past version, store reference information regarding the same document as information corresponding to the original document included in the binder document of the new version and, when the first determination unit determines that there is not the same original document in the original documents included in the binder document of the past version, store an entity file of the original document as the information corresponding to the original document included in the binder document of the new version,
   wherein the reference information has a file size smaller than that of the entity file;
   a deletion instruction reception unit configured to receive a deletion instruction for deleting an arbitrary version of the binder document, the arbitrary version being designated as a deletion target version;
   a second determination unit configured to determine whether there is reference information regarding an entity file of the original document included in the binder document of the deletion target version designated by the deletion instruction, in the binder documents of versions coming after the deletion target version;
   a deletion unit configured to, when the second determination unit determines that there is the reference information regarding the entity file of the original document included in the binder document of the deletion target version, move the entity file to a binder document of a movement target version which is the oldest version among the versions determined to have the reference information, and when the second determination unit determines that there is no reference information regarding the entity file of the original document included in the binder document of the deletion target version, delete the entity file of the original document;
   an updating unit configured to update the reference information included in the binder documents of the versions coming after the movement target version such that the entity file moved to the movement target version is referred to; and
   a main control unit determines whether there is an unprocessed original document having an entity in the binder document of the deletion target version, and when it is determined that there is no unprocessed original document having the entity, completing the deleting of the arbitrary version of the binder document.

2. The document management apparatus according to claim 1, further comprising:
   a batch-acquisition instruction reception unit configured to receive a batch-acquisition instruction to acquire an arbitrary version of the binder document;
   a third determination unit configured to determine whether there is reference information regarding the entity file included in the binder document of the past version, as information corresponding to the original document included in the arbitrary version designated by the batch-acquisition instruction; and
   a generation unit configured to, when the third determination unit determines that there is the reference information regarding the entity file included in the binder document of the past version, integrate the entity file referred to by the reference information into the binder document of the designated arbitrary version to generate a binder document of a transmission version.

3. The document management apparatus according to claim 1, further comprising:
   an original-document acquisition instruction reception unit configured to receive an original-document acquisition instruction for acquiring a designated original document included in a binder document of a designated version;
   a fourth determination unit configured to determine whether the information corresponding to the designated original document included in the binder document of the version designated by the original-document acquisition instruction, is reference information regarding the entity file of the same original document included in the binder document of the past version;
   an acquisition unit configured to acquire the entity file of the designated original document included in the binder document of the past version when the fourth determination unit determines that the information corresponding to the designated original document is the reference information regarding the entity file of the same original document included in the binder document of the past version, and further acquire the entity file of the designated original document included in the binder document of the version designated by the original-document acquisition instruction when the fourth determination unit determines that the information corresponding to the designated original document is not the reference information; and a transmission unit configured to transmit the entity file acquired by the acquisition unit.

4. A document management method that manages a version of a binder document formed by integrating a plurality of original documents, the document management method comprising:

first determining, when updating a binder document, whether there is a same original document as the original document included in a new version of the updated binder document, in the original documents included in a past version of the updated binder document; and storing reference information regarding the same document as information corresponding to the original document included in the binder document of the new version when it is first determined that there is the same original document in the original documents included in the binder document of the past version, and storing an entity file of the original document as the information corresponding to the original document included in the binder document of the new version when it is first determined that there is not the same original document in the original documents included in the binder document of the past version, wherein the reference information has a file size smaller than that of the entity file;

receiving a deletion instruction for deleting an arbitrary version of the binder document, the arbitrary version being designated as a deletion target version;

secondly determining whether there is reference information regarding an entity file of the original document included in the binder document of the deletion target version designated by the deletion instruction, in the binder documents of versions coming after the deletion target version;

moving the entity file to a binder document of a movement target version which is the oldest version among the versions determined to have the reference information when it is secondly determined that there is the reference information regarding the entity file of the original document included in the binder document of the deletion target version, and deleting the entity file of the original document when it is secondly determined that there is no reference information regarding the entity file of the original document included in the binder document of the deletion target version;

updating the reference information included in the binder documents of the versions coming after the movement target version such that the entity file moved to the movement target version is referred to; and determining whether there is an unprocessed original document having an entity in the binder document of the deletion target version, and when it is determined that there is no unprocessed original document having the entity, completing the deleting of the arbitrary version of the binder document.

5. The document management method according to claim 4, further comprising:

receiving a batch-acquisition instruction to acquire an arbitrary version of the binder document;

thirdly determining whether there is reference information regarding the entity file included in the binder document of the past version, as information corresponding to the original document included in the arbitrary version designated by the batch-acquisition instruction; and integrating the entity file referred to by the reference information into the binder document of the designated arbitrary version to generate a binder document of a transmission version when it is thirdly determined that there is the reference information regarding the entity file included in the binder document of the past version.

6. The document management method according to claim 4, further comprising:

receiving an original-document acquisition instruction for acquiring a designated original document included in a binder document of a designated version;

fourthly determining whether the information corresponding to the designated original document included in the binder document of the version designated by the original-document acquisition instruction, is reference information regarding the entity file of the same original document included in the binder document of the past version;

acquiring the entity file of the designated original document included in the binder document of the past version when it is fourthly determined that the information corresponding to the designated original document is the reference information regarding the entity file of the same original document included in the binder document of the past version, and further acquiring the entity file of the designated original document included in the binder document of the version designated by the original-document acquisition instruction when it is fourthly determined that the information corresponding to the designated original document is not the reference information; and transmitting the acquired entity file.

7. A non-transitory computer-readable storage medium that stores a computer-executable process, for managing a version of a binder document formed by integrating a plurality of original documents, wherein the computer-executable process enables a computer to function as an apparatus comprising:

a first determination unit configured to, when updating a binder document, determine whether there is a same original document as the original document included in a new version of the updated binder document, in the original documents included in a past version of the updated binder document;

a storage unit configured to, when the first determination unit determines that there is the same original document in the original documents included in the binder document of the past version, store reference information regarding the same document as information corresponding to the original document included in the binder document of the new version and, when the first determination unit determines that there is not the same original document in the original documents included in the binder document of the past version, store an entity file of the original document as the information corresponding to the original document included in the binder document of the new version;

a deletion instruction reception unit configured to receive a deletion instruction for deleting an arbitrary version of the binder document, the arbitrary version being designated as a deletion target version;

a second determination unit configured to determine whether there is reference information regarding an entity file of the original document included in the binder document of the deletion target version designated by the deletion instruction, in the binder documents of versions coming after the deletion target version;

a deletion unit configured to, when the second determination unit determines that there is the reference information regarding the entity file of the original document included in the binder document of the deletion target version, move the entity file to a binder document of a movement target version which is the oldest version among the versions determined to have the reference information, and when the second determination unit determines that there is no reference information regarding the entity file of the original document included in the binder document of the deletion target version, delete the entity file of the original document;

an updating unit configured to update the reference information included in the binder documents of the versions coming after the movement target version such that the entity file moved to the movement target version is referred to; and determining whether there is an unprocessed original document having an entity in the binder document of the deletion target version, when determines that there is no unprocessed original document having the entity, completing the deleting of the arbitrary version of the binder document.

8. The non-transitory computer-readable storage medium according to claim 7, wherein the computer-executable process enables the computer to function as an apparatus further comprising:

a batch-acquisition instruction reception unit configured to receive a batch-acquisition instruction to acquire an arbitrary version of the binder document;

a third determination unit configured to determine whether there is reference information regarding the entity file included in the binder document of the past version, as information corresponding to the original document included in the arbitrary version designated by the batch-acquisition instruction; and a generation unit configured to, when the third determination unit determines that there is the reference information regarding the entity file included in the binder document of the past version, integrate the entity file referred to by the reference information into the binder document of the designated arbitrary version to generate a binder document of a transmission version.

9. The non-transitory computer-readable storage medium according to claim 7, wherein the computer-executable process enables the computer to function as an apparatus further comprising: an original-document acquisition instruction reception unit configured to receive an original-document acquisition instruction for acquiring a designated original document included in a binder document of a designated version;

a fourth determination unit configured to determine whether the information corresponding to the designated original document included in the binder document of the version designated by the original-document acquisition instruction, is reference information regarding the entity file of the same original document included in the binder document of the past version;

an acquisition unit configured to acquire the entity file of the designated original document included in the binder document of the past version when the fourth determination unit determines that the information corresponding to the designated original document is the reference information regarding the entity file of the same original document included in the binder document of the past version, and further acquire the entity file of the designated original document included in the binder document of the version designated by the original-document acquisition instruction when the fourth determination unit determines that the information corresponding to the designated original document is not the reference information; and a transmission unit configured to transmit the entity file acquired by the acquisition unit.

* * * * *